(12) United States Patent
Richelson et al.

(10) Patent No.: US 11,030,600 B2
(45) Date of Patent: *Jun. 8, 2021

(54) SYSTEM AND METHOD FOR REMOTE MANAGEMENT OF SALE TRANSACTION DATA

(71) Applicant: Lightspeed Commerce USA, Inc., New York, NY (US)

(72) Inventors: Jason Richelson, New York, NY (US); Jason Ordway, New York, NY (US)

(73) Assignee: Lightspeed Commerce USA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,307

(22) Filed: May 22, 2020

(65) Prior Publication Data
US 2020/0286060 A1    Sep. 10, 2020

Related U.S. Application Data

(63) Continuation of application No. 15/921,018, filed on Mar. 14, 2018, now Pat. No. 10,699,261, which is a continuation-in-part of application No. 14/622,235, filed on Feb. 13, 2015, now Pat. No. 9,965,755, which is a continuation-in-part of application No. 13/037,048, filed on Feb. 28, 2011, now Pat. No. 9,317,844.

(60) Provisional application No. 61/940,195, filed on Feb. 14, 2014, provisional application No. 61/309,678, filed on Mar. 2, 2010.

(51) Int. Cl.
*G06Q 50/00* (2012.01)
*G06Q 20/20* (2012.01)
*G06Q 40/00* (2012.01)
*G07G 1/00* (2006.01)
*G06Q 30/06* (2012.01)

(52) U.S. Cl.
CPC ......... *G06Q 20/202* (2013.01); *G06Q 20/206* (2013.01); *G06Q 30/06* (2013.01); *G06Q 40/12* (2013.12); *G07G 1/0009* (2013.01)

(58) Field of Classification Search
CPC .................................................. G06Q 20/202
See application file for complete search history.

(56) References Cited

U.S. PATENT DOCUMENTS

| | | | | |
|---|---|---|---|---|
| 2003/0101257 | A1* | 5/2003 | Godwin | G07G 1/14 709/223 |
| 2004/0181454 | A1* | 9/2004 | Manno | G06Q 20/202 705/21 |
| 2010/0191979 | A1* | 7/2010 | Zipperer | G06F 9/4812 713/189 |
| 2011/0125566 | A1* | 5/2011 | McLaughlin | G06Q 30/0222 705/14.23 |

(Continued)

*Primary Examiner* — Talia F Crawley
(74) *Attorney, Agent, or Firm* — Sabety + associates, PLLC; Ted Sabety

(57) ABSTRACT

This invention discloses a novel system and method for providing retail point of sale terminals that are connected securely over the Internet to a back-office service that manages the retailer's data as a service using a system that supports more than one retailer, each of which will have one or more point of sale terminals. The system is adapted to provide transaction reconciliation with an accounting system whenever a user ends a shift and logs out of the register instance they are operating.

19 Claims, 18 Drawing Sheets

(56) References Cited

U.S. PATENT DOCUMENTS

| | | | |
|---|---|---|---|
| 2011/0218872 A1* | 9/2011 | Richelson | H04L 63/123 705/18 |
| 2011/0246284 A1* | 10/2011 | Chaikin | G06Q 30/00 705/14.38 |
| 2012/0191522 A1* | 7/2012 | McLaughlin | G06Q 50/01 705/14.23 |

* cited by examiner

SYSTEM AND METHOD FOR REMOTE MANAGEMENT OF SALE TRANSACTION DATA

PRIORITY INFORMATION

This application claims priority as a continuation of U.S. patent application Ser. No. 15/921,018 filed on Mar. 14, 2018 which is a continuation of U.S. patent application Ser. No. 14/622,235, filed on Feb. 13, 2015, now issued as U.S. Pat. No. 9,965,755 issued on May 8, 2018, which claims priority as a non-provisional continuation of U.S. Provisional Patent Application No. 61/940,195 filed on Feb. 14, 2014, which are herein incorporated by reference in their entireties. The '235 application is a continuation-in-part to U.S. patent application Ser. No. 13/037,048 filed on Feb. 28, 2011, now U.S. Pat. No. 9,317,844 issued on Apr. 19, 2016, which claims the benefit of provisional U.S. Pat. App. No. 61/309,678 filed on Mar. 2, 2010, all of which are incorporated herein by reference in their entireties.

FIELD OF INVENTION

This invention is related to point of sale systems typically used in retail stores. The invention is a novel architecture that permits a retail store owner to obtain sale transaction data management as a service instead of purchasing such a system and maintaining it.

BACKGROUND

In typical point of sale systems for retail stores, a set of special purpose computers are positioned at the retail checkout locations. These are locally networked with a server located at the site of the retail store. For many retail stores, this requires a level of system maintenance responsibility that is beyond the staff capabilities of the retailer or too costly. In this invention, the point of sale system is designed so that it is provided as a service shared among participating retail vendors. With this kind of an architecture, the invention provides the service security, data integrity, robustness and redundancy.

This invention relates to a system and method for executing sale transactions and managing the data associated with the transaction, for example, pricing and inventory. Typical point-of-sale systems have dedicated point of sale devices that are connected over a local area network to a local server computer dedicated to that specific vendor's system. Other systems use credit card readers that are connected by a wide area network to a system that clears the transaction, but the actual sale transaction data is managed using the dedicated system. In general, these dedicated systems are costly to buy and maintain. As a result, there is a need for a sale transaction data management system that can be shared by more than one vendor and offered as a service to these vendors, rather than a system that each vendor has to own and maintain.

DETAILED DESCRIPTION OF THE PREFERRED EMBODIMENTS

Figure 1:
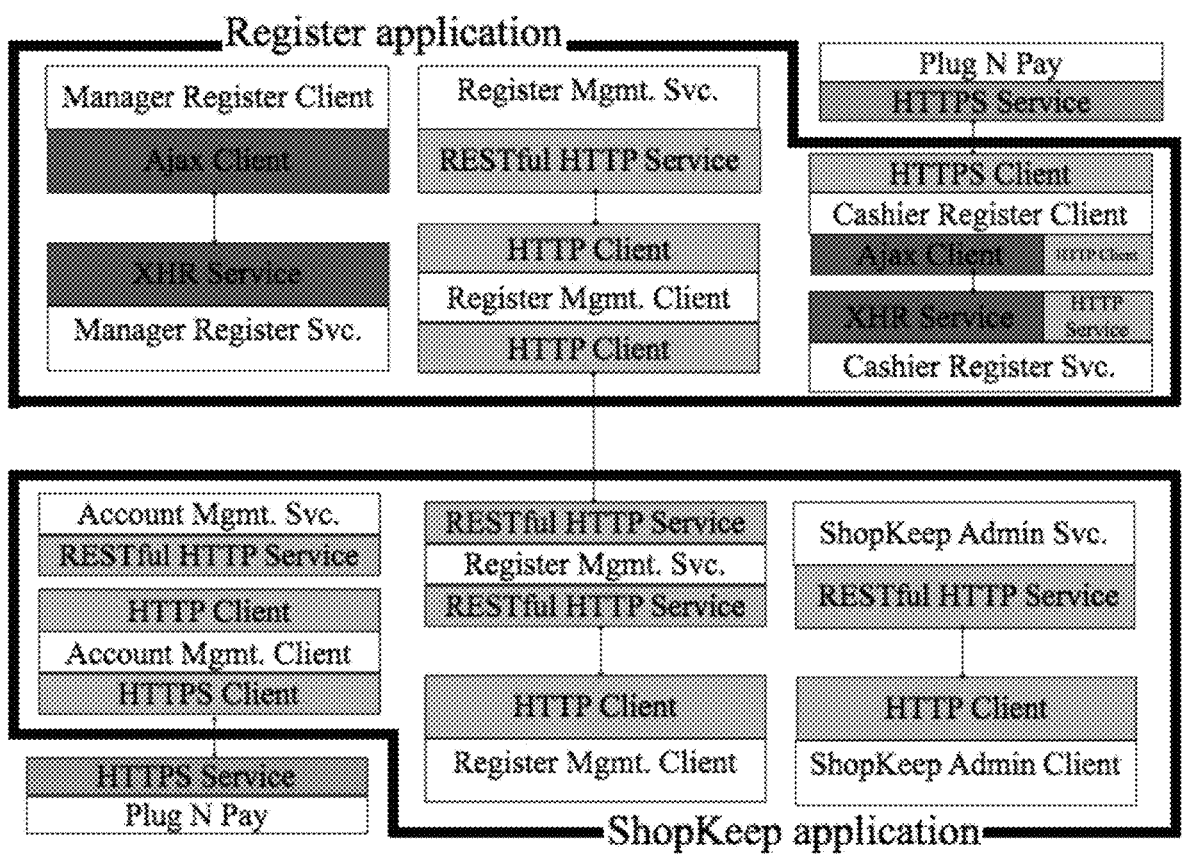
FIG. 1. Schematic of basic system architecture.

The typical embodiment of the system is centered around one or more servers that are hosted externally from the point of sale locations of the one or more vendors that use the system. Typically the servers are connected to the Register instances over a Wide Area Network, typically the Internet. A server is a computer containing or operatively connected, through a data network, one or more mass storage devices. The servers operate together as the repository of vendor information associated with the point of sale terminals. In the preferred embodiment, the terminals are typical personal computers operating an instance of the Register software. The servers are operatively connected to the point of sale terminals over a data network, a wide area network. In one embodiment, the Internet is the wide area network. The servers are accessed in several ways. The primary access is by means of the point of sale terminals. However, the servers are accessible from the Internet by other computers as well. The point of sale terminals is typically a personal computer running a typical operating system, for example, Windows™. In the preferred embodiment, a point of sale terminal is created by means of operating the Register software on a personal computer running Windows™.

Register Software Instance: Each computer at a point of sale location that acts as the transaction input interface or terminal is a typical personal computer running an instance of the point of sale software, or Register software. The Register software is designed to execute particular protocols that cause communication between the Register software instance and the servers. The protocol is designed to ensure that the Register software has access to that part of the database hosted by the servers associated with the vendor whose Register terminal is making the access. In this architecture, each Register instance communicates across the wide area network, including the Internet to the servers housing the database information associated with the vendor. In addition, the Register software is designed so that where a vendor has more than one terminal operating the Register software, the specific instance of Register that is accessing the server is identifiable by the database.

When the Register software is installed on a personal computer, the system operating on the servers execute a protocol to verify that the software has not been tampered with. In one embodiment, the Register software installs itself and then runs various checksums on the executable code modules that it uses. These check sum values are transmitted to the servers using a protocol that isolates the Register software instance from a specific vendor's database and instead has it interact with the service administrative engine.

The administrative engine checks the check sum values and then issues an authenticating key or keys when these values are found to be correct. The authenticating key or keys can be a unique pair of numbers, which are a login and password. The login and password can be hashes of the service customer identity or other information stored only on the back office server.

Each instance of the Register software is also tied to the specific machine it has been installed on: The software, on installation, can recover hardware information to use as a seed for digitally signing various code components or generating encryption keys during installation. The seed values can include the CPU chip serial number, a serial number off of the hard drive, the MAC address from the network card, or a unique number derived from the layout of data on the hard drive. The software, when operating, uses these values to ensure that the code is operating on the machine it is intended for. The back-office administrative software operating on the server checks that the Register software instance that has been installed and is communicating with the server meets the authentication requirements. During the activation process, the authorized vendor representative, referred to as a manager, inputs a user name and password, subdomain for that customer and the register number to be assigned to that Register instance for that vendor-customer. The sub-domain is that part of the server database that is assigned to the vendor-customers. The back office server checks that the manager's user name, password and subdomain match up with the same entries in the back office database records associated with the vendor customer. Once verified, the Register is considered activated and a back office login identifier, which in one embodiment is the login identifier and password are downloaded to the Register. These two items are used by the Register software instance to communicate securely with the back office servers for that subdomain, that is, the subdomain assigned to the vendor-customer of the service. The Register's login identifier, which in one embodiment is a login and password are used with each request sent up to the back office server so that it can authenticate each request from that Register instance and to map it to the correct subdomain. The system assigns a login identifier, which in one embodiment is a login and password to each Register instance when the vendor-customer sets up the register. When the Register software is activated, that data is downloaded to the register and that is used by Register to access the system database. At that point, that instance of the Register software is authorized to access the subdomain of the database in the back office associated with the vendor-customer whose manager activated the Register instance.

Once the Register software has been securely installed on a machine, the vendor personnel can use it to connect to their specific database operating on the server. An authorized vendor personnel is prompted to input the vendor identity, a user name and password to log in as the operator for the cash register station.

On first log-in, the server will obtain a registration key from the administrative engine and a password input into the Register software that is transmitted up to the server during the first log-in process. The vendor user who knows this password can activate the instance of the Register software. In this way, the installed instance of the Register software is associated with a particular customer of the service. In one embodiment of the invention, the Register software does not save this master password. Instead, a secure browser session is opened to the back office server at the same time as the Register software instance is attempting to be activated. The back office servers check that the IP address of the browser session where the master password has been input matches the IP address associated with the Register software instance.

Once the Register software is authenticated, the server software component will then associate in the vendor's database that specific Register instance with the vendor's account. In addition, the server software will create a data record associated with that instance of Register that is then populated with data that the vendor wants, for example, the store location, or location in the store that the terminal occupies. If the vendor already has inventory data and price data in the database that the Register terminal must have, the system will automatically transmit the data down to the new Register terminal so that a copy is stored on that terminal on its mass storage device. In this manner, each Register terminal has a copy of the necessary inventory, pricing and transaction information.

Once the Register instance has been initialized, the retail store personnel can use it to tally sales. The Register software presents a browser type interface with a user-customizable series of interactive screens that present the workflow typically used by that vendor. When a sale is made, the Register system looks in its local mass storage for the pricing associated with the unit sold.

At that point a transaction ticket is created, meaning a data object representing the transaction. That ticket contains a Register identifier, personnel identifier, item number, price and any other information the vendor has decided to associate with the transaction. The transaction ticket is transmitted to the server in conformance with the interactive protocol with the server.

Figure 18:
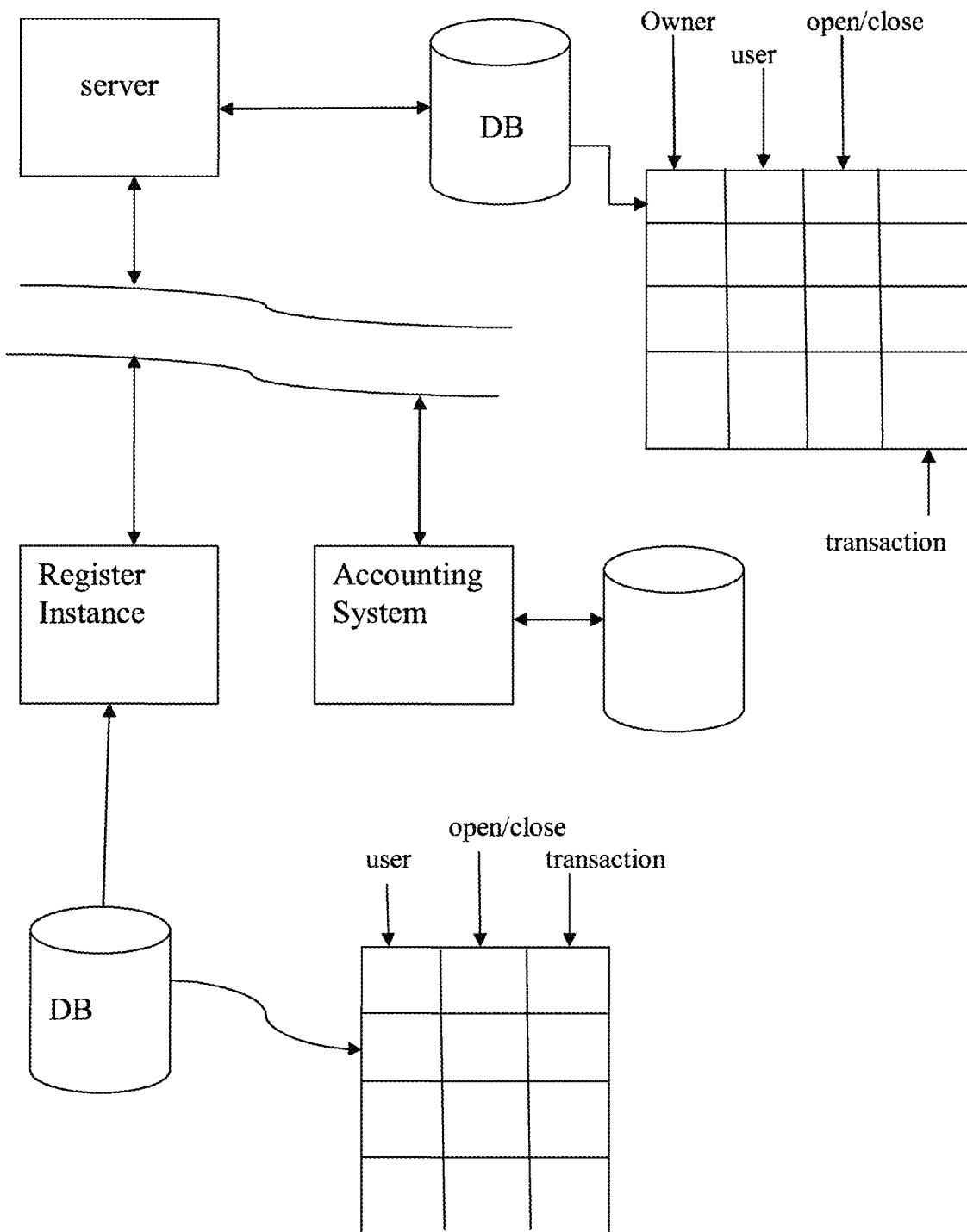
FIG. 18. Example system architecture for shift reconciliation

When a transaction occurs on the Register, it pushes that information up to the back office server. The Register software contains several components that permit it to act as its own file server, database server and browser. The reason is that this provides simple robustness when the network connection over the WAN or Internet is down. The Register software maintains its own local database that mirrors the essential information present on the system server relevant to that Register license. When the system server is updated with new data for that vendor, where that Register instance is implicated, the server causes the database update to be transmitted down to the Register instance so that its database is updated. Likewise, the local database holds the transaction tickets. These are also transmitted to the system server when the network connection is re-established. As the transactions are processed by the system server, the status is updated both on the system server and the local Register software database. In one embodiment, the system does a data consistency check to be sure that the latest pricing and inventory data has been updated in the Register instance and that the latest transaction data in the Register has been updated in the back-office server database. When a work shift is opened on a given register software instance, the register software requests updates from back office system servers. When the work shift is closed, the transaction data records on that register instance are updated to a closed state in order that the data may be transmitted to an accounting system, as shown in FIG. 18, in order to update the accounting records of the business as of the close of shift.

Figure 16:
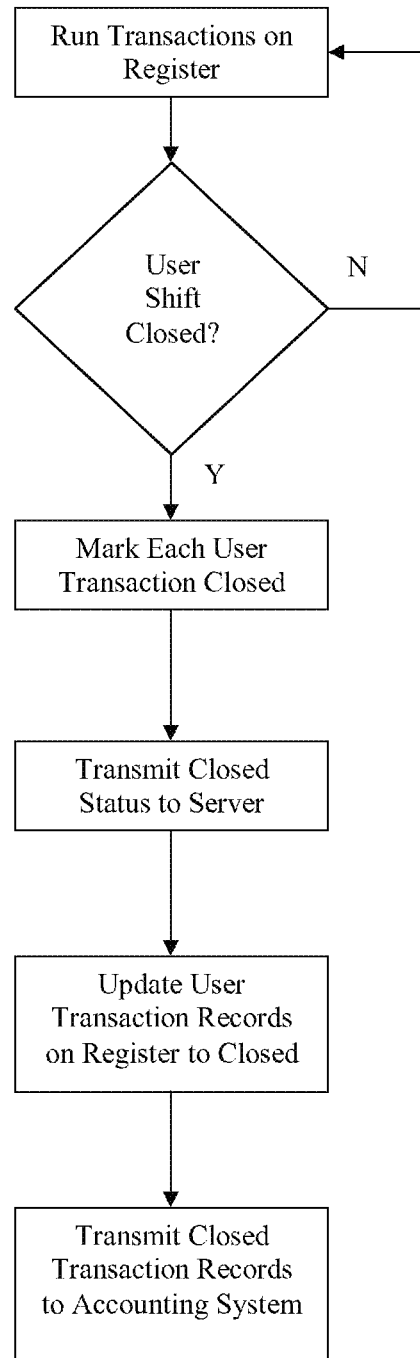
FIG. 16. Flow chart for shift completion.
Figure 17:
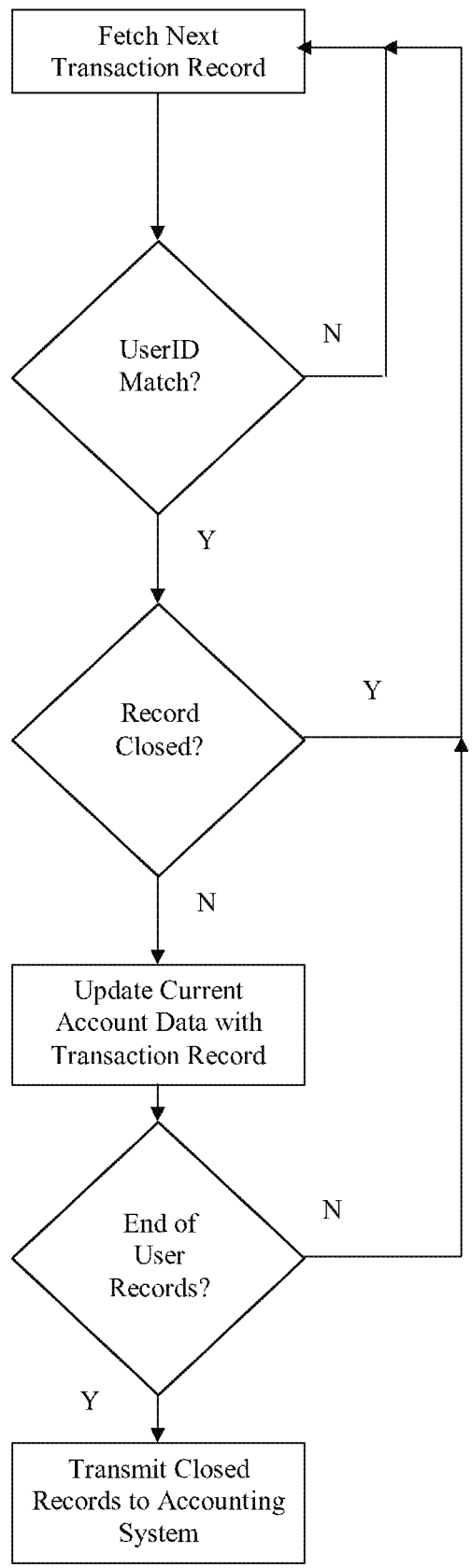
FIG. 17. Flow chart for shift reconciliation.

In another embodiment of the invention, when the person who is logged into a register instance as its user completes a shift, the register instance runs shift reconciliation. The transaction tickets corresponding to the transaction events are stored in the computer comprising the register instance. See FIG. 18. The transaction tickets may be embodied in a data structure that has an additional data tag embodying a data value representing whether transaction ticket is open or closed, which, when closed means that the transaction ticket is part of a closed shift and the transaction ticket may be transmitted to an accounting system for reconciliation with the business accounts. In one embodiment, depicted in FIG. 16, the register instance, when the user closes the shift, updates the transaction tickets for that user residing on that register instance to the closed state and then transmits that transaction ticket data up to the server so that the server can update the server's database. In another embodiment, the register instance transmits the transaction ticket open/close status update if the server already has the transaction ticket data. In that embodiment, the data message has a reference number for a transaction ticket and an updated open/close state data value. In yet another embodiment, the transaction tickets are maintained on the server, and when the shift closes, the user of the register instance logs out having given a command to close the shift. The user interface provided to the authorized user has an input that the user can actuate to indicate that they want to close their shift, for example, if they are going home. When the register instance detects the condition of closing the shift the register instance then transmits to the server a command indicating that the shift is closed for that user. As depicted in FIG. 17, the server then modifies data tags associated with the transaction tickets that are associated with the user so that they indicate that the transaction tickets for that user are closed. In this embodiment the server runs a process that checks all open transaction tickets for the user whose shift is now in the closed state and then sets those transaction tickets to the closed state.

In this embodiment the server periodically or on command sweeps transaction ticket data to an accounting system, for example, at the end of each shift, the end of each day or every few hours. By means of the data tags encoding whether the transaction ticket is closed or not, the system operating on the server can select those transaction tickets that are marked closed, and then transmit the relevant transaction data to the accounting system. The accounting system may be an externally accessed accounting system that operates on separate servers, operatively connected via the internet. In other embodiments, the accounting system may be a separate application with its own database that operates on the same servers as the point of sale system, but is a separate application for security or financial control requirements.

In one embodiment, the protocols between the Register software and the system server initiates the protocol connection. In the preferred embodiment, Ruby library for Network connectivity and HTTP communication protocols are used. In the preferred embodiment, all communication between the Register software and the system servers uses HTTPS and SSL, without caching and for encrypted transmission.

An activated Register software instance is ready to be used during each work shift. To launch a shift, a user, typically the employee manning the retail customer checkout, logs into the Register software. This user has a user name and password or login ID. These have been generated by the person with Manager authority directly logging into the back office database and entering the user and password or login ID into the database as an authorized user.

The user name and password or login ID are sent to the back office for verification. As noted below, each transaction with the back office includes the login and password for the Register software instance. This pair has been generated by the back office server on activation and is associated with the service customer associated with the activation of the Register software. Therefore, the user name and password are checked in the database of authorized users associated with that service customer. The mapping process takes the Register login and password, selects the sub-domain associated with that login and password, checks the password, then looks in that sub domain authorized user list for the user name and then checks the user password. In another embodiment, the user has a key generating hardware device, that periodically generates a new password. The user can type this number into the Register, which passes it up to the back office for verification.

When the user has been authenticated, the user is prompted to input the contents of the cash drawer. This information is transmitted to the back office. The Register software instance also downloads any updates to the inventory count, new authorized user names and any other information that is needed to update the Register instance. In one embodiment, the credit card transaction processing password information is not permanently stored on the Register computer. Instead, it is downloaded from the subdomain of the database each time a shift is started. Therefore, the Register instance, when the shift is started and the user verified, receives the credit card transaction processing password anew. By this means, each opening of the Register for a new shift results in a check with the back office to get permission to run credit card transactions.

If the Register closed, the publisher password for credit card processing is deleted. When opened again it is sent back down to the Register. In one embodiment a new publisher password is created for each shift. In another embodiment, the same password is used, but it is freshly encrypted by the back office server at each shift and the encrypted version is sent down with a new decryption key. In another embodiment, the Register has to receive the credit card processing password with each credit card transaction. In another embodiment, the credit card transaction is passed up to the back office server and the back office server processes the credit card transaction and returns confirming transaction data to the Register.

When the local Register is deactivated, the local database is erased. In one embodiment, the Register checks whether the data has been uploaded to the back office server and warns the user before the user commits to deactivating the Register instance. Once the Register instance is deactivated, the back office deletes the Register login and password from the list of authorized Register instances.

When the Register is suspended at the end of a shift, any data not uploaded to the back office server is uploaded. If the back office server is unavailable, the data is stored locally and queued for such uploading once a connection is reestablished.

Additional Security Protocols.

In other embodiments, additional security protocols may be used.

1. The manager level user has the power to log into the back office sub-domain associated with the vendor-customer of the service and deactivate a particular Register instance. The manager can use a browser to securely log into the database. The database server can operate scripts to prevent the data associated with the vendor-customer. When that occurs, the Register login and password associated with that Register instance is deleted from the list of authorized Register login and password pairs.

2. The back office is notified by the Register instance when it is activated for a new shift. The system stores in the database the date and times those new shift activations occur. The back office system can be set with a trigger so that if a particular Register instance wakes up for a new shift during a pre-determined black out period, that Register is automatically deactivated by the back office server systems.

3. In another embodiment, the back office system transmits an encryption and decryption key pair to be used for a particular session with a particular Register instance. This pair is delivered when the Register wakes up for a new shift and transmits a notification to the back office server. This shift key pair is used to authenticate requests with the back office subdomain for that Register for that shift.

In addition, the key pair can be used to transmit an encrypted version of the credit card processing login and password information. Furthermore, the shift key decryption key can be used to obtain the key for decrypting the critical credit card processing code modules in the Register software. At the end of the shift, when the Register is changed to a new shift or is set to sleep, the shift key for that expired shift is deemed invalid by the back office server.

Architecture

FIG. 1 shows the basic architecture of the Register instance operating on the point of sale computer. A locally run web-server service is operated as Localhost:3000. Everything in that box is the local server operation operating as a service to the other applications. Customers, items for sale, employees with login and passwords, returns and vouchers, e.g. store coupons are accessed through the locally operated web server.

Figure 2:
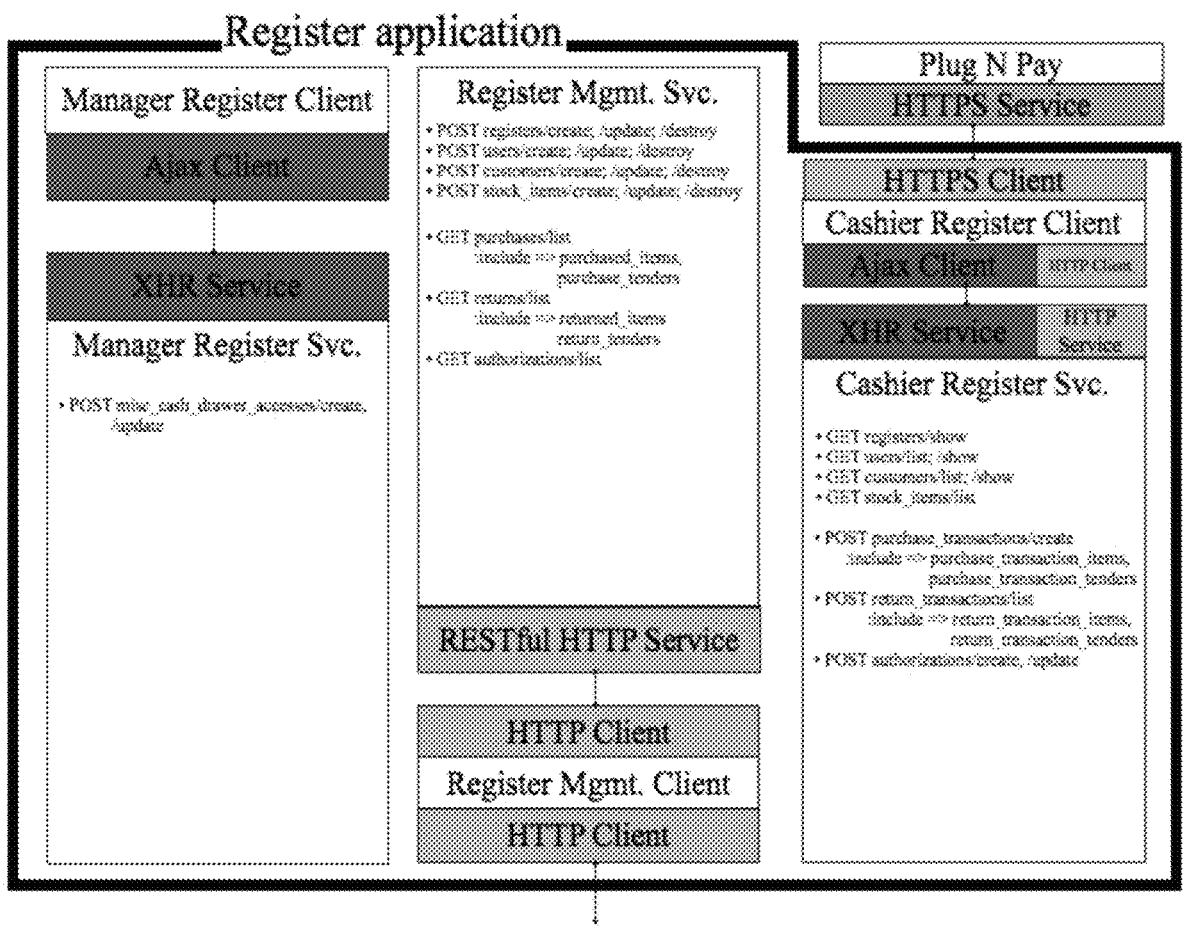
FIG. 2. Schematic of Register software architecture.

FIG. 2 shows more detail of the Register instance.

Manager Register Client. This component allows the Register instance to be opened or closed. The person with Manager level security access can access this component.

Cashier Register Client is how the cashier operating the point of sale accesses the system. This is through the browser that accesses the localhost 3000 service. The Cashier logs in and only gets access to the cashier services.

Register Management Service: This is a back-office component that allows authorized persons to update items, customers, and activates and deactivates the registers. To bring on a cashier as an individual, the vendor-customer must log into the back office to add that person, by inputting a user id and password for that person. The Manager register client would talk to the) XHR, which would then talk to the Register Management Service to update the authorized employees. At that point the Register instance gets authentication for the new cashier from the back office.

However, to get such authentication, a person with seniority logs into the back office directly using a browser, and then opens the employees tab to add the new employee. That way, when the manager updates a Register instance to authorize the new cashier, that cashier is already found in the back-office database.

Figure 3:
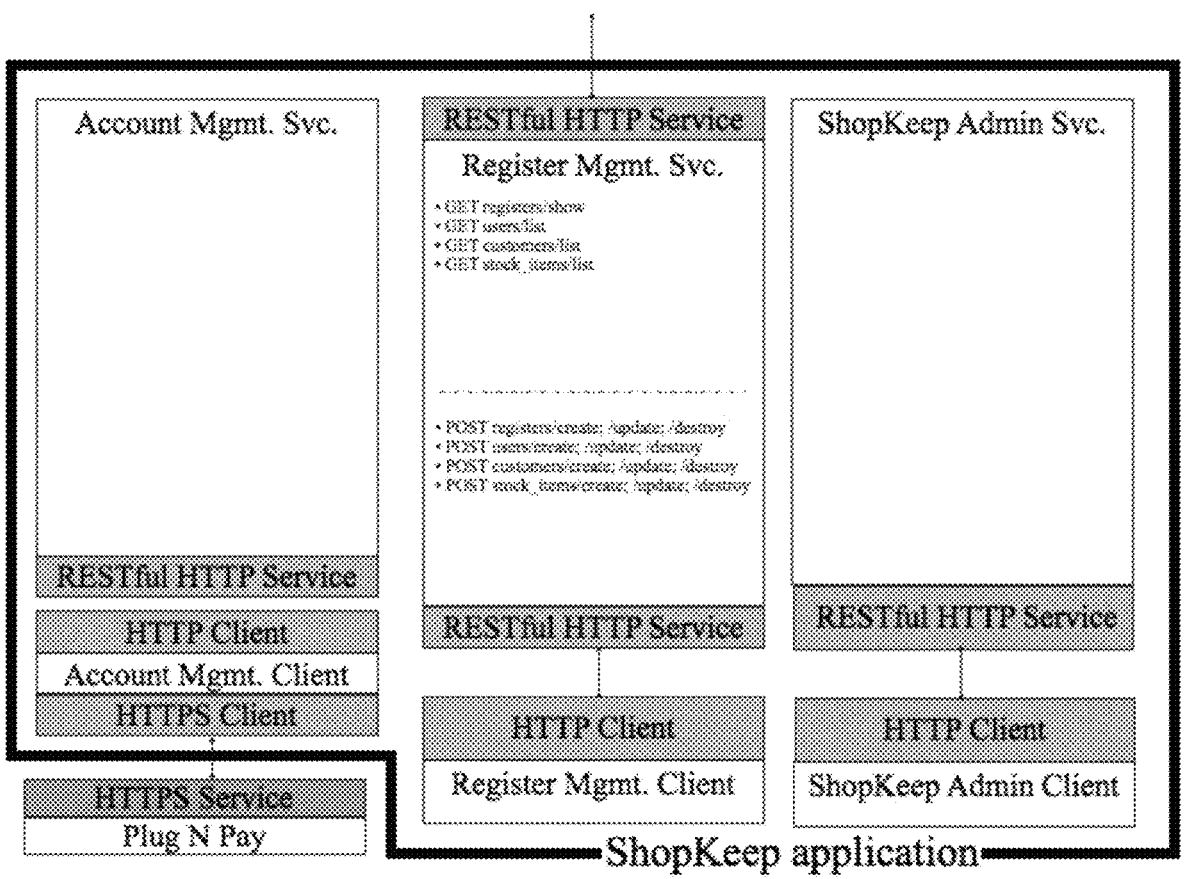
FIG. 3. Schematic of Server back office architecture.
Figure 4:
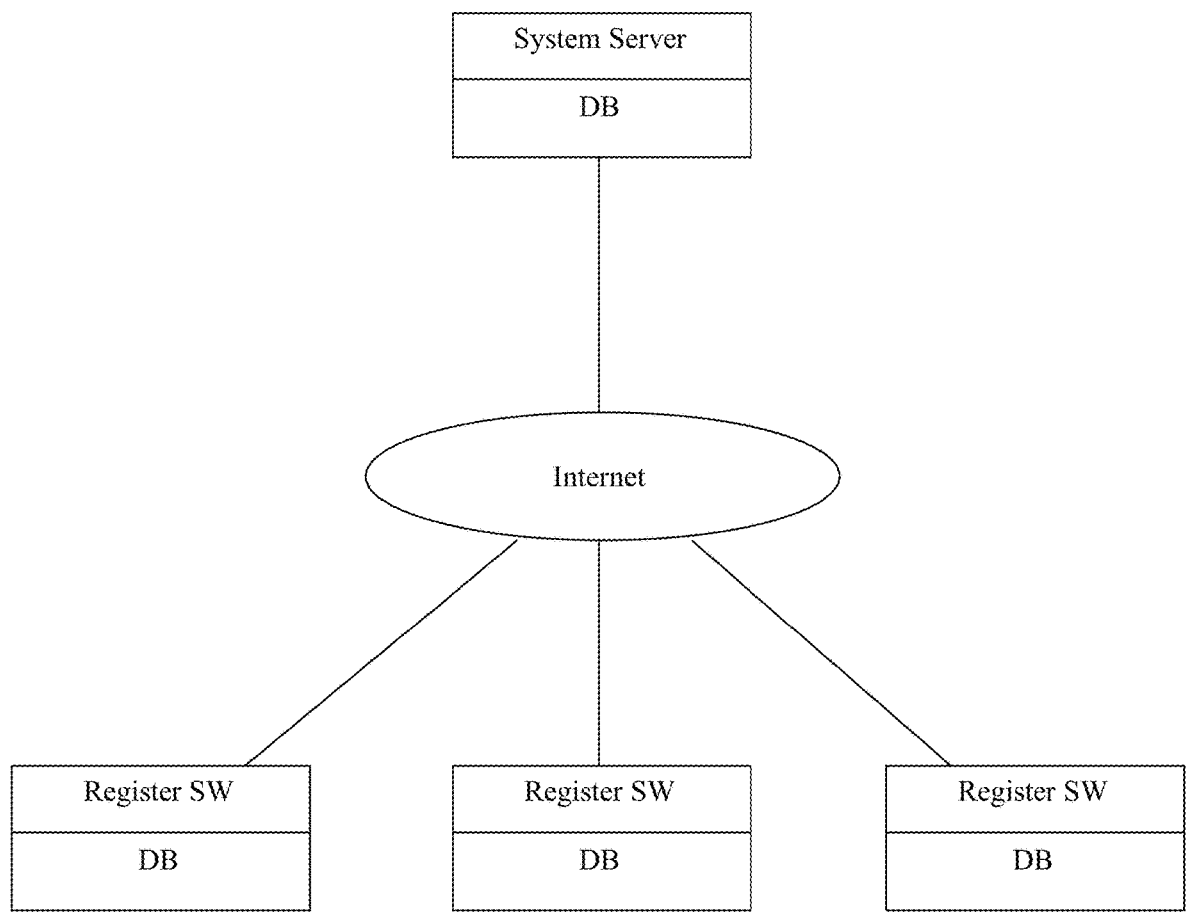
FIG. 4. Schematic of Network topology.
Figure 5:
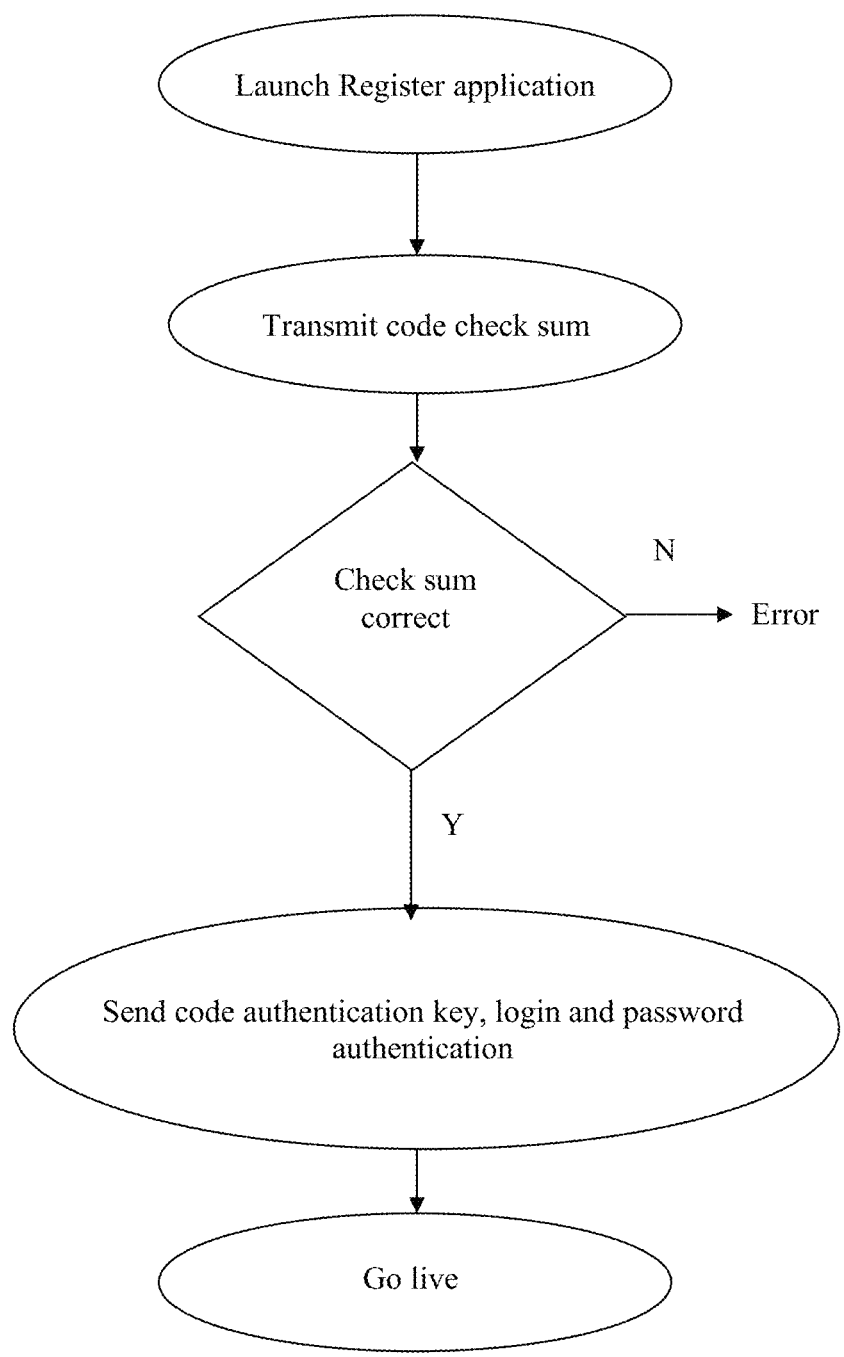
FIG. 5. Flow chart for Register launch.
Figure 6:
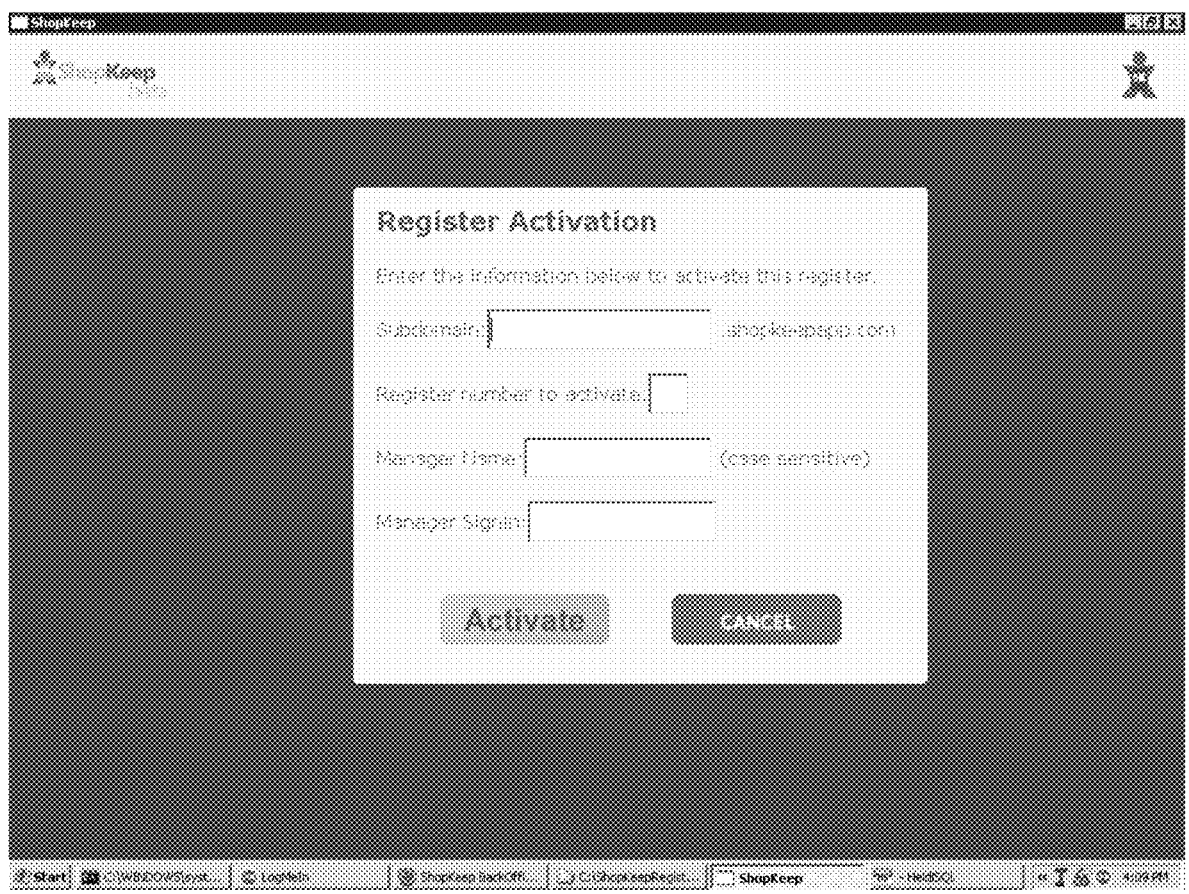
FIG. 6 is a typical user interface to activate the Register software.
Figure 7:
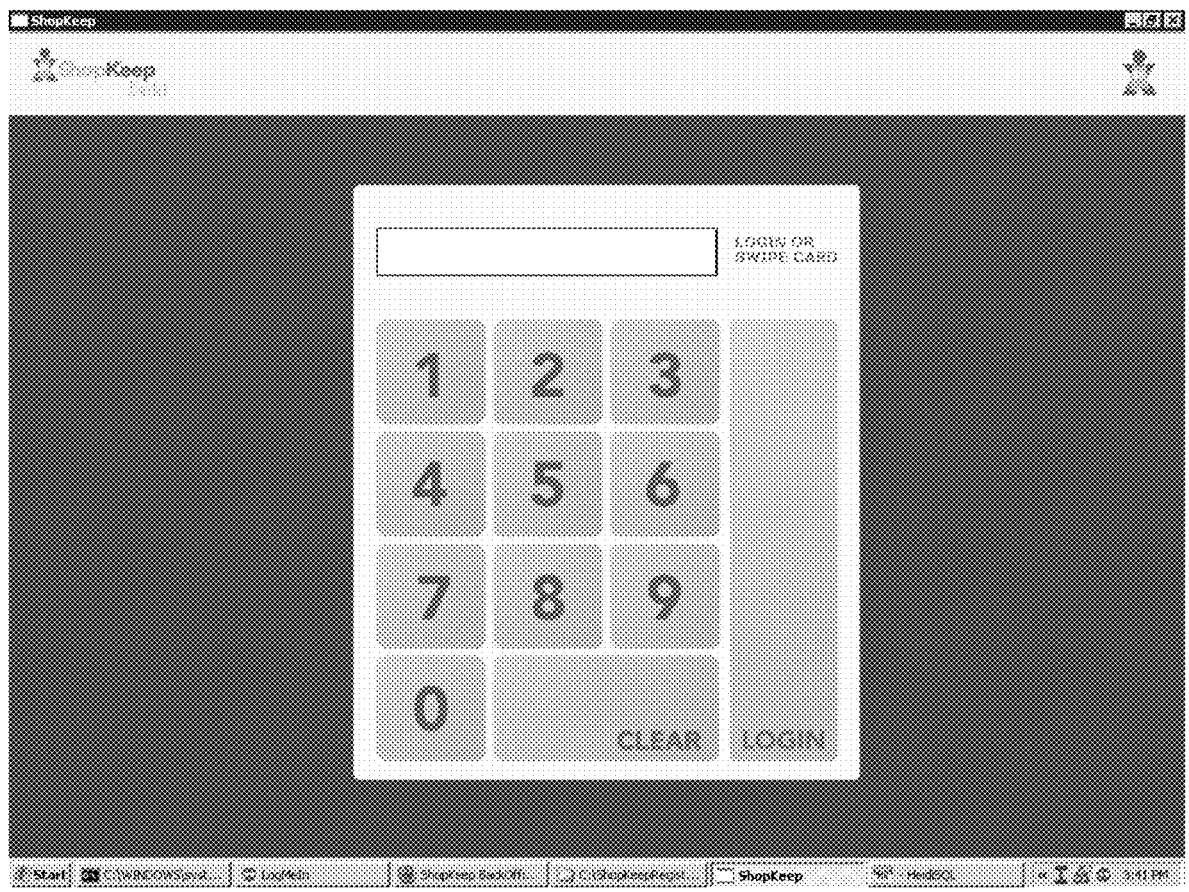
FIG. 7 is the log-in user interface for starting a shift using the Register.
Figure 8:
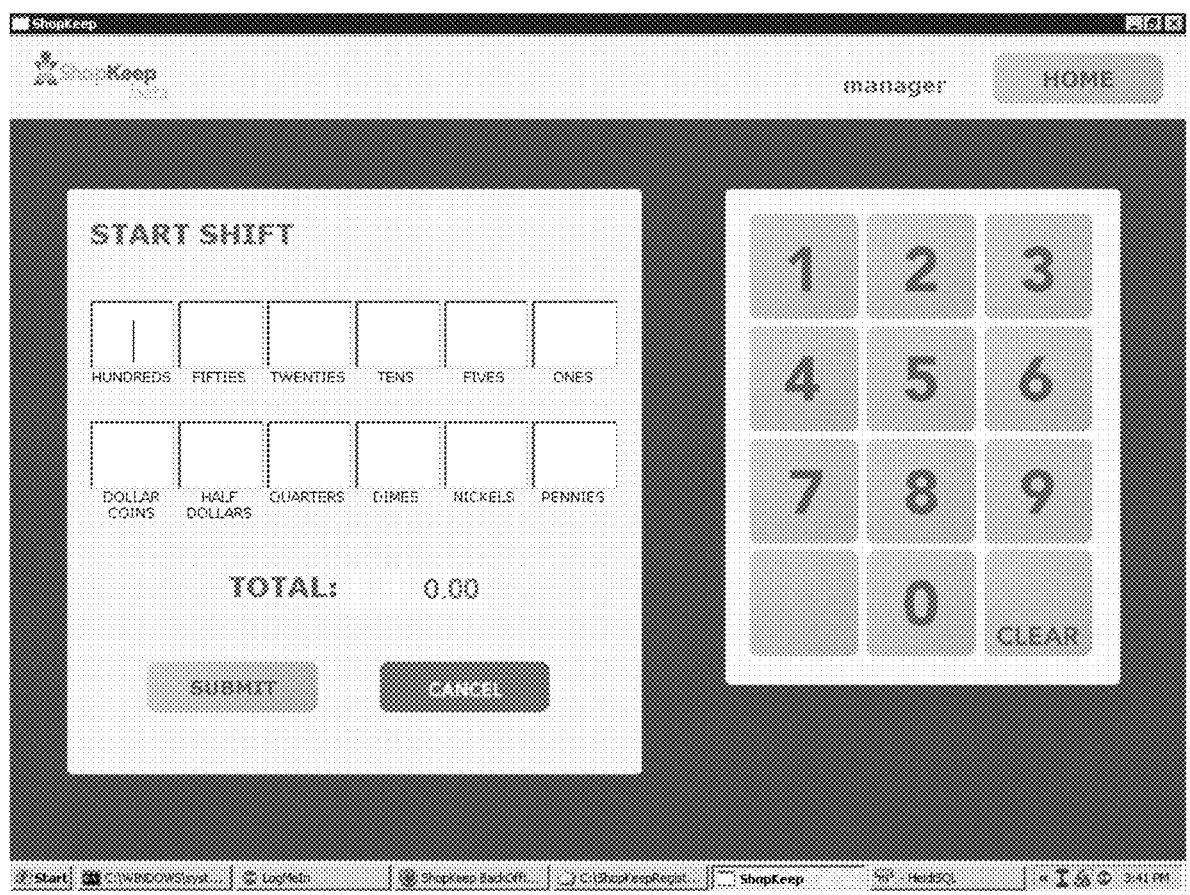
FIG. 8 is the user interface for inputting the cash tally into the Register.
Figure 9:
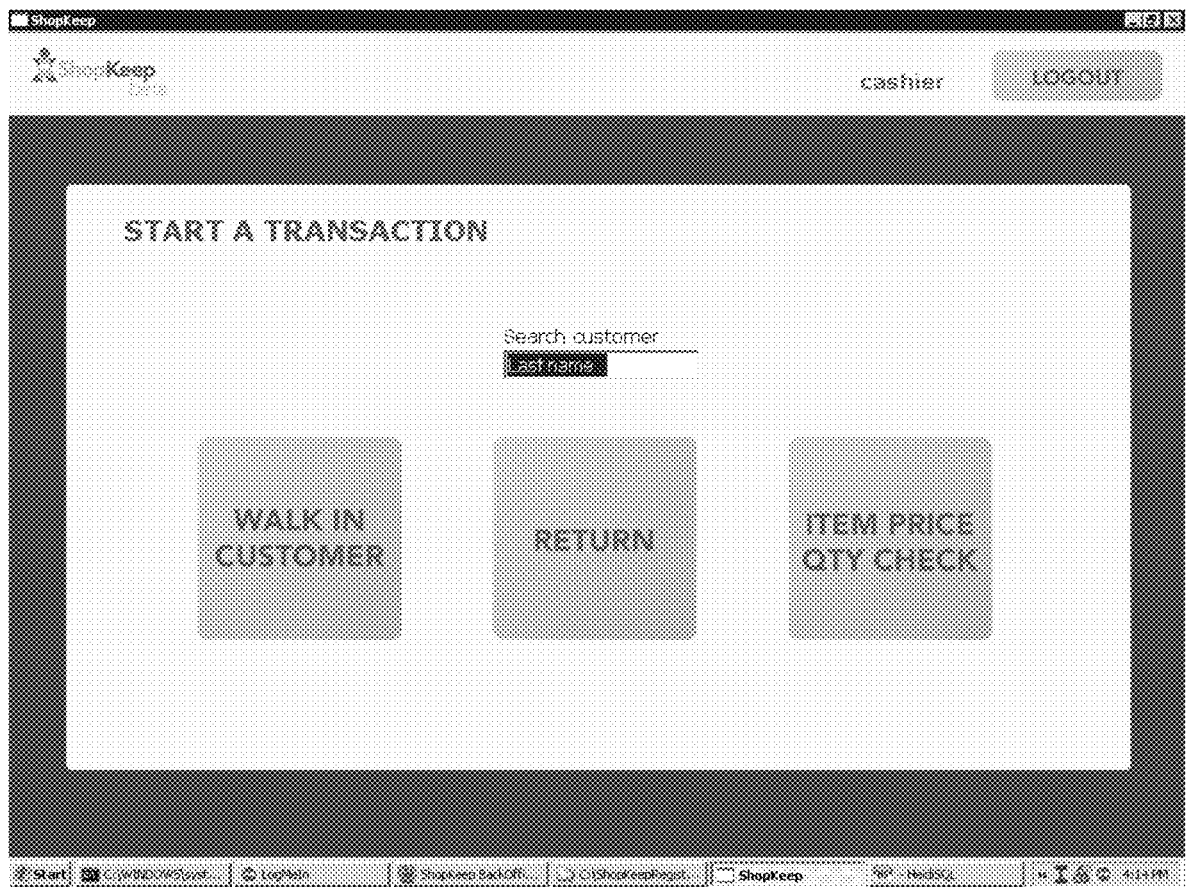
FIG. 9 is the user interface for conducting a transaction.
Figure 10:
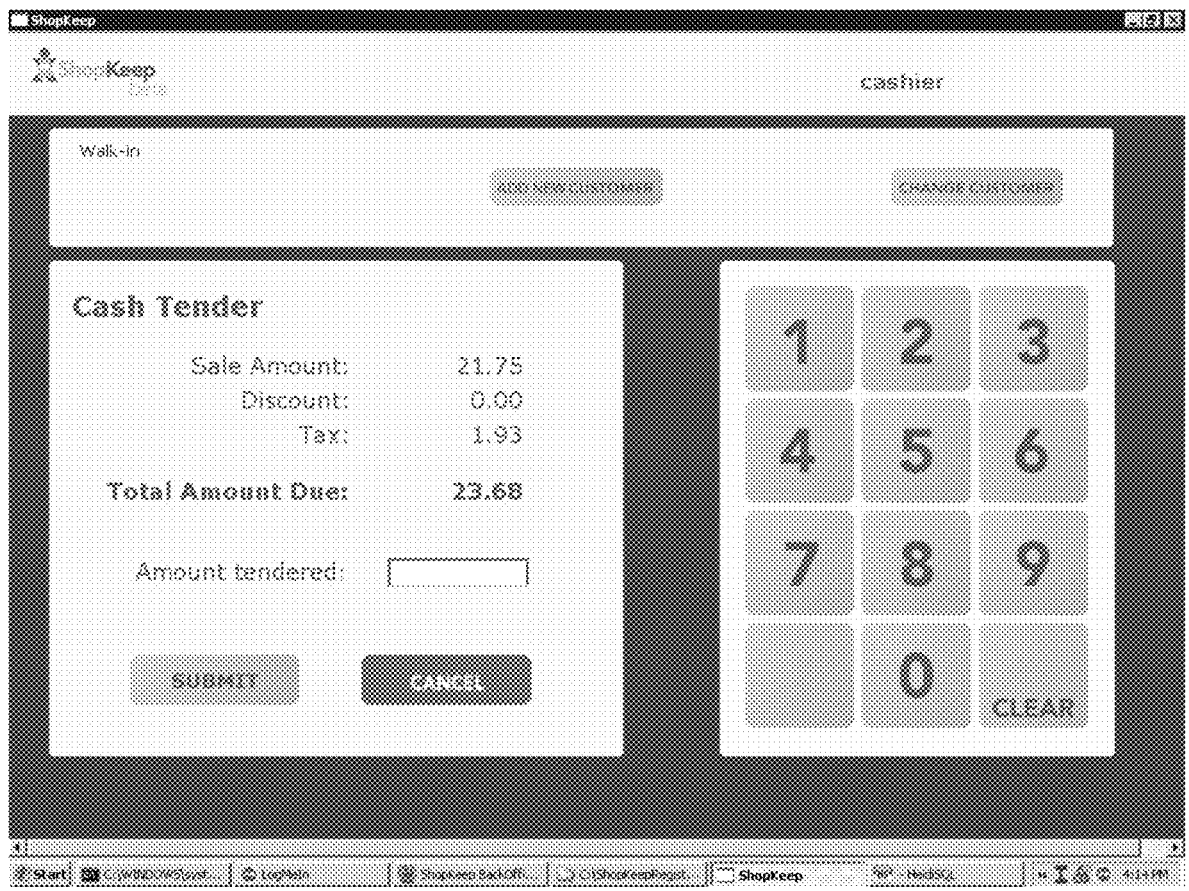
FIG. 10 shows the transaction invoice sheet.
Figure 11:
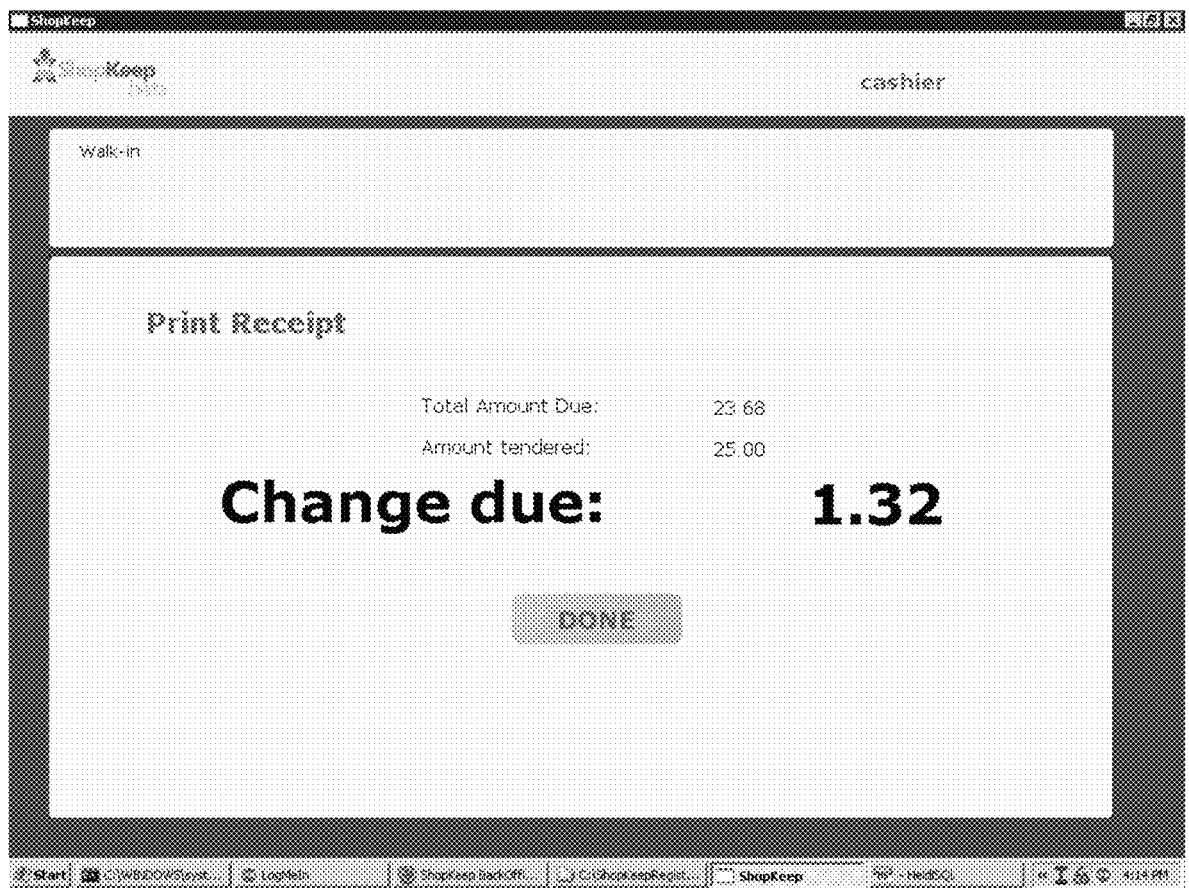
FIG. 11 is the user interface for a cash transaction.
Figure 12:
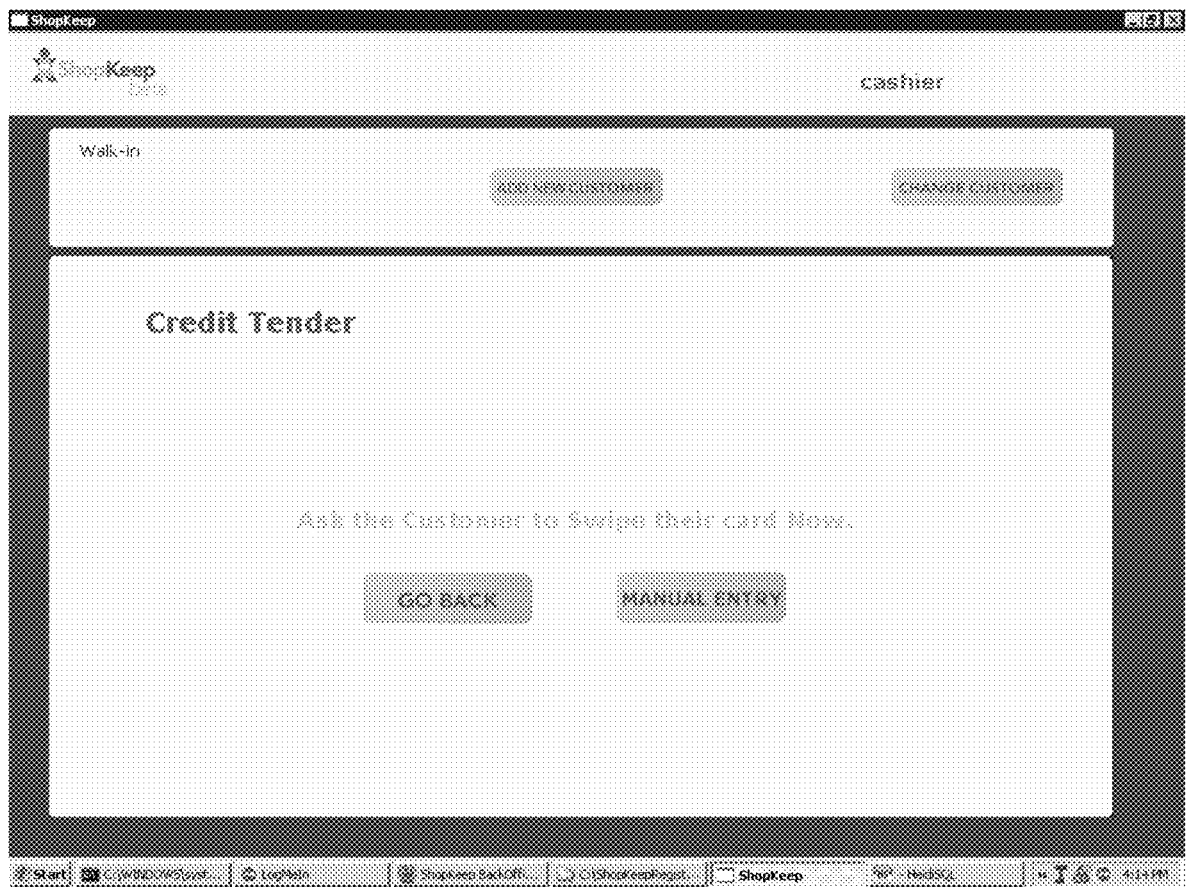
FIG. 12 is the display for showing change.
Figure 13:
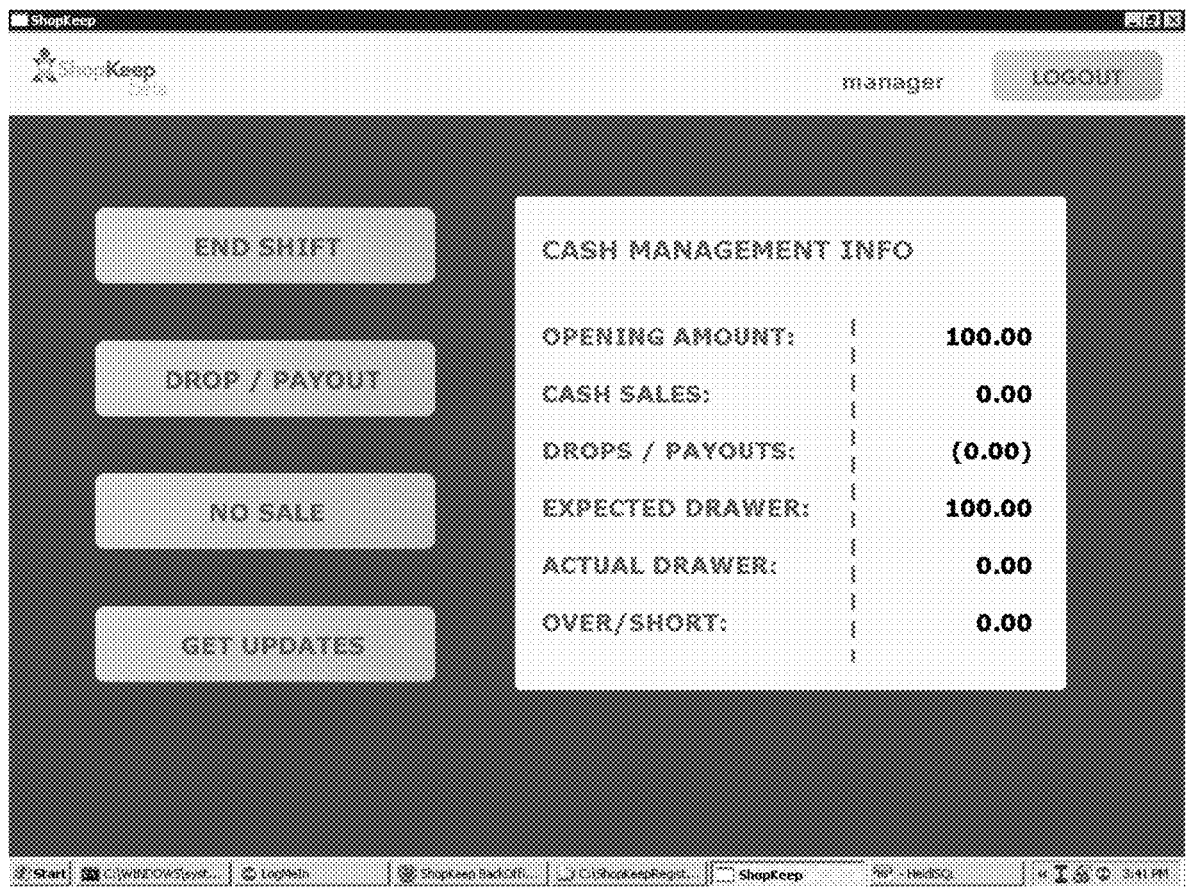
FIG. 13 shows the display for a credit card transaction.
Figure 14:
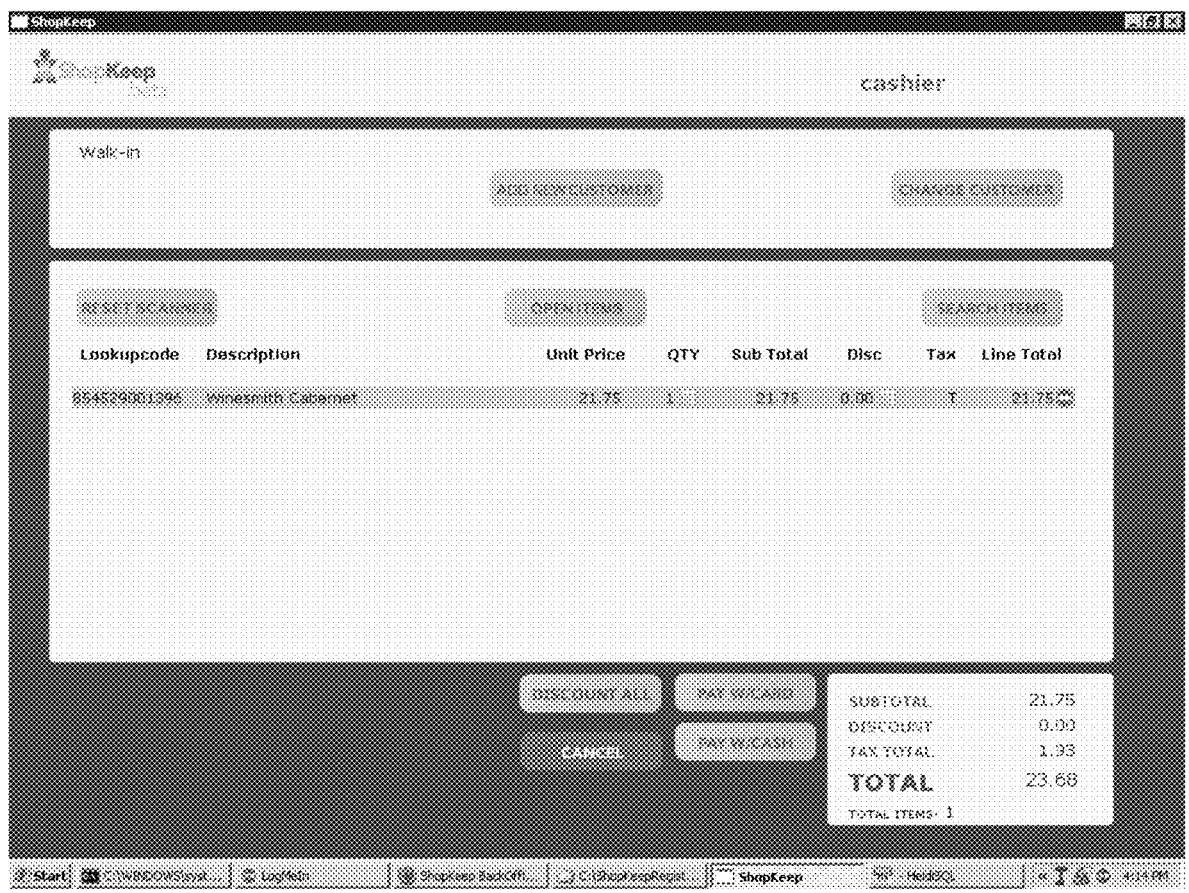
FIG. 14 shows the end of shift tally display.
Figure 15:
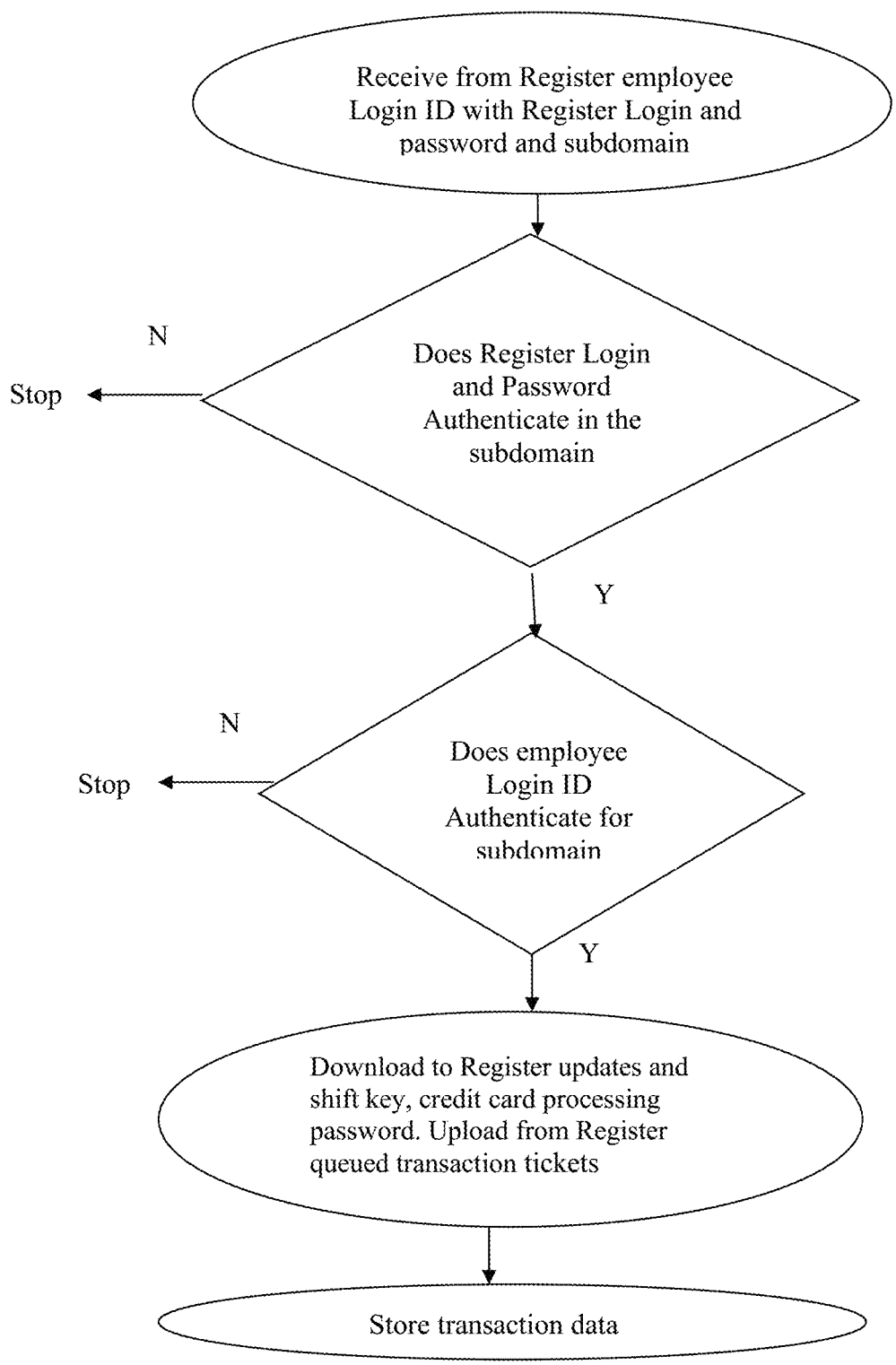
FIG. 15. Flow chart for shift start.

FIG. 3 shows the Back Office Architecture that the localhost 3000 accesses across the Internet. When the local web server operating as part of the register software is requested to process data that the web server needs the back office server to provide, the local web server executes the scripts that cause the local web server to assemble message packets, including the login and password for that Register instance and transmit them out across the Internet to the back office server. The Back Office server receives these message packets and then parses them. The login and password information is extracted and then confirmed. If confirmed, the rest of the message is executed. For example, a data message representing a message can be received, in which case the data message additionally contains the sub-domain, the amount of a transaction and the inventory item. The back office then updates the database entry in the subdomain with the appropriate change in inventory as well as revenue and cash present in the Register instance.

Account Mgmt: This component permits the authorized personnel of the vendor-customer, typically a manager, to log into the back office using an Internet browser and access the data associated with the one or more stores through the web services offered by that module. Inventory, sales history, customer history, reporting and all of the other data categories are available and presented using the scripts for convenient display on the browser.

Shopkeep AdminSvc. This service component is accessed by the operator of the system. Access can be provided by an Internet browser. A given vendor-customer's access to the system can be terminated or blocked or the data in that subdomain installed, read, backed up or modified. This service also permits the operator of the invention to collect statistical data about sales and inventor activity managed using the system.

Database:

The repository is organized as one or more databases. In one embodiment, there is one database, and every data record is associated with a particular vendor by means of an entry in the data record indicating its owner. In another embodiment, each vendor using the system has a separate database of its own. In this latter approach, each database is housed on a server that is only accessible by a particular vendor or the service hosting the database for the vendor. In the preferred embodiment, each vendor has an individual subdomain uniquely identified with the client within the multi-tenant database. Using sub-domains within a database structure provides that the correct vendor information is mapped to the correct Register software clients.

The database is accessible using a web-browser by authorized users. This permits authorized personnel, including vendor personnel so authorized to review the activity of the Register instances associated with the vendor. The system, through the protocols with the Register instances permits the vendor personnel accessing the database through the web-interface to retrieve information from the Register instances that the vendor personnel request. The Register software and the system server protocols ensure that all queries into system database are limited to the sub domain associated with the Register instance, and prior to the query being executed, it check whether that session has been authenticated.

Network Robustness: An additional aspect of the invention is that the Register software, when it cannot access the servers due to a network problem, is designed to store transaction information locally and then transmit the information to the servers when the network is detected to be up again. At the same time, the database, when it attempts to update data locally on a Register instance and cannot because the network is down, will store the transaction data so that when the network is detected to be up again, the updated data is transmitted to the Register instance it was intended for. The servers also provide all the vendors payment clearance services.

Transaction Processing: The system servers connect the vendor's transactions to the credit card processor of their choice. This is accomplished by housing a credit card payment gateway on the system server. In the preferred embodiment, Plug n Pay™ is used as the credit card payment gateway. This subservice connects the system to a number of credit card processors. With this architecture, the transaction processing performed by the system for the vendors is simple: a transaction ticket that is received by the database sub-domain is used to update the sub-domain database, for example, decrementing the associated inventory and storing the credit card transaction. The system then translates the transaction, and through a standardized API (application programming interface), the appropriate payment process request is created, for example, containing the vendor name, any security code required, and the associated payment processor. This data request is then converted to drive the API presented by the credit card processing gateway. The gateway code module then transmits this information to the gateway service itself and the rest of the transaction is taken care of downstream from there. In another embodiment, the Register instance has the gateway login data and it assembles and transmits the credit card transaction directly to the gateway and transmits the continuing data up to the back office server.

Security is a major concern for a distributed point of sale service system. The first level of security is that the Register software is designed so that it cannot be tampered with. The second level is that the protocol interaction between the Register software instance and the servers across the Internet is encrypted and secured against tampering or interception. The third level of security is the access to the database from the Internet. It is essential that if the Register software protocol becomes known, that spoofing software cannot access the database by simulating the Register software protocol. In the preferred embodiment, all communication with the back office servers are using is HTTPS and SSL, no caching, encrypted transmission. In addition, each request for action transmitted from the Register instance contains the login and password associated with the Register instance. In another embodiment, the back office server checks that the Register number, login and password match up, and then process the request.

In important aspect of the invention is that the system servers are housed on the WAN, which in the preferred embodiment is the Internet. In this way, the system server can present a web-interface, like a web-server to authorized users. In this embodiment, an authorized user from a vendor can access a web-page with typical log-in and security access protocols. Once logged in to the system server, the web-page can take as input data query requests, and given the identity of the vendor, run database queries. The query results for that session are then transmitted out to the web-browser that requested them. As noted above, the queries are not run unless the log-in session is fully authenticated. This way, the system permits the vendor's personnel to check on the business operation from wherever an Internet connection is available.

The system architecture also makes possible new ways of electronically marketing a vendor's goods and services. For example, when a retailer adds an item to inventory, the system can automatically on selection cause an electronic image and announcement to be sent out to Twitter™ or another similar social network site as an announcement from the retailer. As an example, a wine merchant may have a Twitter account to which a number of customers are associated. When the Beaujolais Nouveau arrives in the store, the wine merchant, through a web-interface, will update the store inventory to include whatever number of cases have arrived. The system, when it detects that the retailer has updated inventory with a new item or replenished an item that had been sold out, can present the retailer the option, on the interface, to announce that fact. By clicking on a link, the system can then take the from the database the description of the item and then obtain from the database the twitter account information associated with the retailer. The system can also present an input box that permits the retailer to include a specific text message to be included. The system then automatically formulates a message, using the item description, logs into Twitter™ and then inputs the message. As a result, the arrival of the wine is announced to the customer group immediately. This system can also automatically export a photo and description to Twitter or another social site, enabling consumers to see it almost immediately.

In another embodiment, the system can be set to automatically scan the Internet for news items associated with text strings derived from the vendor's inventory database. As a result, when such a match is found, the system can deliver an electronic message to the retailer with a link to where the mention was found. As an example, the system can monitor a news ticker that automatically searches the Internet for mentions of products and descriptions in inventory—so the storekeeper would get an alert if, say, The New York Times ran a story about an item in stock, such as United Bamboo's limited edition cat calendar. In another embodiment, the system can provide an interface with other shopping social networking websites, like Foursquare™ or Milo.com™. In these cases, a search on those site for a particular item in a location is transmitted to the system as an external data query request. If a vendor has authorized the system to do so, the external query can be run within the system across the sub-domains of the vendors who permit this. When the item is found, the locality can then be checked. If the item and locality meet the query requirements, a message can be transmitted back to the requesting service that contains the identity of the vendor and their location. In addition, the message can contain a hyperlink to the vendor's website. A vendor can create a pre-determined introductory message that can be retrieved from the vendor's subdomain that is then made part of the message.

Operating Environment:

The Register software operates as a local web stack, or web application, but the application runs locally on the computer operated as the cash register. The computer operates a browser, which in the preferred embodiment, is a prism browser with limited functionality. The browser accesses localhost3000, which runs the Mongrel web server application. The web server operates various code modules that are Ajax™ and Java™ scripts. Also running locally is a local database, for example, HeidiSql or mySql. By arranging the local software components as Ajax and Java scripts accesses locally, the platform is device independent. In one additional embodiment, the web application constituting the Register software instance can run on a hand-held computer, like an iPhone™ or Blackberry™ or similar so-called smartphone device.

The web server application also operates a background service that maintains interaction between the Register and the back office servers. When the Register processes a sale transaction, the background service is called to transmit the information to the back office computer. Likewise, when the back office updates its inventory or other variables relevant to the Register, the background service recognizes a request by the back office to update the data on the local computer and the updated is downloaded and stored.

The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it remotely using a network. In one embodiment, the user's computer is omitted, and instead an equivalent computing functionality is provided that works on a server. In this case, a user would log into the server from another computer over a network and access the system through a user environment, and thereby access the functionality that would in other embodiments, operate on the user's computer. Further, the user may receive from and transmit data to the central server by means of the Internet, whereby the user accesses an account using an Internet web-browser and browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In one embodiment, a user's computer can run an application that causes the user's computer to transmit a stream of one or more data packets across a data network to a second computer, referred to here as a server. The server, in turn, may be connected to one or more mass data storage devices where the database is stored. In addition, the access of the web site can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In addition, the user's computer may obtain data from the server that is considered a website, that is, a collection of data files that when retrieved by the user's computer and rendered by a program running on the user's computer, displays on the display screen of the user's computer text, images, video and in some cases outputs audio. The access of the website can be by means of a client program running on a local computer that is connected over a computer network accessing a secure or public page on the server using an Internet browser or by means of running a dedicated application that interacts with the server, sometimes referred to as an "app." The data messages may comprise a data file that may be an HTML document (or other hypertext formatted document file), commands sent between the remote computer and the server and a web-browser program or app running on the remote computer that interacts with the data received from the server. The command can be a hyper-link that causes the browser to request a new HTML document from another remote data network address location. The HTML can also have references that result in other code modules being called up and executed, for example, Flash, scripts or other code. The HTML file may also have code embedded in the file that is executed by the client program as an interpreter, in one embodiment, Javascript. As a result a data message can be a data packet transmitted from or received by a computer containing a destination network address, a destination process or application identifier, and data values or program code that can be parsed at the destination computer located at the destination network address by the destination application in order that the relevant data values or program code are extracted and used by the destination application.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (TO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. In some embodiments, data stored in memory may be stored in the memory device, or an external mass data storage device like a disk drive. In yet other embodiments, the CPU may be running an operating system where storing a data set in memory is performed virtually, such that the data resides partially in a memory device and partially on the mass storage device. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. For example, the CPU may obtain two data values from memory and the logic in the CPU determine whether they are the same or not. Based on such Boolean logic result, the CPU then selects a first or a second location in memory as the location of the next step in the program execution. This type of program control flow may be used to program the CPU to determine data, or select a data from a set of data. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as Javascript, C, C++, JAVA, or HTML or scripting languages that are executed by Internet web-browsers) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more elements, encoded into computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A method of managing retail transaction data performed by a computer system comprised of at least one server connected over a data network to a first computer operating a register software instance, said method comprising:
   receiving at the server from the first computer, a user identifier associated with the register software instance;
   receiving at the server from the first computer, data comprised of a first at least one transaction data;
   storing in a database the received first at least one transaction data in a corresponding first at least one data records comprised of a corresponding first at least one data values representing at least one of an open logic state or a closed logic state and a second data value representing the user identifier;
   receiving at the server from the first computer a data message representing the condition that the user associated with the user identifier has selected an end of shift command on the register instance;
   selecting from the database a set of data records associated with the user identifier by using the received user identifier and the second data value comprising the stored at least one data records; and
   updating in the database at least one of the selected set of data records by changing the first data value comprising the selected set of data records from an open logic state to a closed logic state.

2. The method of claim 1 where the transaction data is comprised of data representing an item number and a price.

3. The method of claim 1 further comprising:
   on the first computer, storing a second at least one transaction data comprised of data representing at least one of an open logic state or a closed logic state;
   on the first computer, in response to the input of the end of shift command, transmitting the second at least one transaction data to the server;
   at the server, storing the transmitted second at least one transaction data in the database by storing a corresponding second at least one data records comprised of a corresponding at least one data values representing a closed logic state and a data value representing the user identifier.

4. The method of claim 1 further comprising:
   on the first computer, storing a second at least one transaction data comprised of data representing an at least one logic state of open;
   on the first computer, in response to the input of the end of shift command, updating the second at least one transaction data by changing the data representing the logic state of open to data representing the logic state of closed.

5. The method of claim 4 further comprising:
   at the first computer, transmitting the changed second at least one transaction data to the server;
   at the server, storing the received second at least one transaction data in the database.

6. The method of claim 1 further comprising:
   at the server, selecting from the database at least one of the stored transaction data records with the first data value in closed logic state;
   accessing by an accounting system, the selected transaction data records and an identifier associated with an authorized owner of the register instance; and
   updating in the accounting system, data stored that is associated with the authorized owner by using the data comprising the received transaction data records.

7. The method of claim 6 where the selection from the database comprising the server system occurs automatically in response to the server system receiving log-in information from a user of the server system, verifying that the received log-in information is associated with the authorized owner and receiving from such user input data representing a command to commence the selection of the transaction data records and accessing and updating by the accounting system.

8. The method of claim 6 where the selection of the transaction data records and accessing and updating by the accounting system occurs in response to the server determining that a pre-determined period of time has passed since the last time the selection of the transaction data records and accessing and updating by the accounting system has occurred.

9. The method of claim 6 where the selection of the transaction data records and accessing and updating by the accounting system occurs automatically at pre-determined times.

10. A method of managing retail transaction data performed by a computer system comprised of at least one server connected over a data network to a first computer operating a register software instance, said method comprising:
   receiving at the server from the first computer operating a register software instance a user identifier associated with a data value stored on a database, said data value representing an authorized owner of the register software instance;
   on the first computer, storing an at least one transaction data comprised of data representing a logic state of open;
   on the first computer, in response to an input of the end of shift command, updating the at least one transaction data by changing the data representing the logic state of open to a logic state of closed;
   on the first computer, transmitting the updated at least one transaction data to the server;
   at the server, storing the received at least one transaction data in a set of corresponding at least one data records comprising the database, each of said set of at least one data records comprised of data that logically links the at least one data record to the authorized owner.

11. The method of claim 10 where the transaction data is comprised of data representing an item number and a price.

12. The method of claim 10 further comprising:
   at the server, selecting from the database at least one of the stored transaction data records with the first data value in closed logic state;
   accessing by an accounting system, the selected transaction data records and an identifier associated with an authorized owner of the register instance; and
   updating in the accounting system, data stored that is associated with the authorized owner by using the data comprising the received transaction data records.

13. The method of claim 10 where the selection from the database comprising the server system occurs automatically in response to the server system receiving log-in information from a user of the server system, verifying that the received log-in information is associated with the authorized owner and receiving from such user input data representing a command to commence the selection of the transaction data records and accessing and updating by the accounting system.

14. The method of claim 10 where the selection of the transaction data records and accessing and updating by the accounting system occurs in response to the server determining that a pre-determined period of time has passed since the last time the selection of the transaction data records and accessing and updating by the accounting system has occurred.

15. The method of claim 10 where the selection of the transaction data records and accessing and updating by the accounting system occurs automatically at pre-determined times.

16. A method of managing retail transaction data performed by a computer system comprised of at least one server connected over a data network to a first computer operating a register software instance and further comprised of an accounting system, said method comprising:
   receiving at the server from the first computer, data comprised of a first at least one transaction data;
   storing in a database the received first at least one transaction data in a corresponding first at least one data records comprised of a corresponding first at least one data values representing at least one of an open logic state or a closed logic state and data logically linking the transaction data record to an authorized owner of the register instance;
   at the server, selecting from the database at least one of the stored transaction data records with the first data value in a closed logic state;
   accessing by the accounting system, the selected transaction data records; and
   updating in the accounting system, data stored that is logically associated with the authorized owner of the register instance by using the data comprising the selected transaction data records.

17. The method of claim 16 where the selection from the database comprising the server system occurs automatically in response to the server system receiving log-in information from a user of the server system, verifying that the received log-in information is associated with the authorized owner of the register instance and receiving from such user input data representing a command to commence the selection of the transaction data records and accessing and updating by the accounting system.

18. The method of claim 16 where the selection of the transaction data records and accessing and updating by the accounting system occurs in response to the server determining that a pre-determined period of time has passed since the last time the selection of the transaction data records and accessing and updating by the accounting system has occurred.

19. The method of claim 16 where the selection of the transaction data records and accessing and updating by the accounting system occurs automatically at pre-determined times.

* * * * *